(12) United States Patent
Shieh

(10) Patent No.: US 6,701,866 B1
(45) Date of Patent: Mar. 9, 2004

(54) AUTOMATIC FEEDING APPARATUS FOR PETS

(76) Inventor: Shenz-Tsornz Shieh, P.O. Box 25-7, Kaohsiung City 811 (TW)

( * ) Notice: Subject to any disclaimer, the term of this patent is extended or adjusted under 35 U.S.C. 154(b) by 0 days.

(21) Appl. No.: 10/419,915

(22) Filed: Apr. 9, 2003

(51) Int. Cl.[7] .............................. A01K 5/02; A01K 5/00
(52) U.S. Cl. .................................. 119/51.11; 119/51.5
(58) Field of Search .............................. 119/51.11, 51.5, 119/51.12, 57.1, 57.5

(56) References Cited

U.S. PATENT DOCUMENTS

| | | | | |
|---|---|---|---|---|
| 4,422,409 A | * | 12/1983 | Walker et al. | 119/51.11 |
| 4,922,857 A | * | 5/1990 | Arentoft | 119/51.12 |
| 5,483,923 A | * | 1/1996 | Sabbara | 119/51.11 |
| 6,427,628 B1 | * | 8/2002 | Reece | 119/51.11 |
| 6,487,987 B1 | * | 12/2002 | Choi | 119/51.5 |
| 2002/0096120 A1 | * | 7/2002 | Busha | 119/51.5 |

* cited by examiner

Primary Examiner—Charles T. Jordan
Assistant Examiner—Elizabeth Shaw

(57) ABSTRACT

An automatic feeding apparatus for pets includes a housing with an elevated bottom plate. A slide is mounted below an opening in the bottom plate and located above a food pan for pets. A hopper is mounted in the housing and above the bottom plate for receiving food particles. A dispense plate is rotatably supported between the bottom plate and the hopper. The dispense plate includes at least one hole for receiving a dispense cylinder therein. The food particles enter a through-hole of the dispense cylinder via a feed outlet of the hopper when the dispense cylinder is moved to a position below the feed outlet. The food particles in the dispense cylinder falls into the food pan via the opening of the bottom plate and the slide when the dispense cylinder is moved to a position above the opening of the bottom plate.

7 Claims, 6 Drawing Sheets

AUTOMATIC FEEDING APPARATUS FOR PETS

BACKGROUND OF THE INVENTION

1. Field of the Invention

The present invention relates to an automatic feeding apparatus for pets.

2. Description of the Related Art

FIG. 6 of the drawings illustrates a conventional automatic feeding apparatus for feeding pets in a case that the pet owner is not able feed the pet on time. The automatic feeding apparatus includes a frame 7 for mounting a feeding device 8 and a control mechanism 9. The frame 7 includes four legs 71 having adjusting slots 72 defined therein. The feeding device 8 includes a hopper 81 for receiving food and a telescopic tube assembly 82 attached to a lower end of the hopper 81. The telescopic tube assembly 82 includes a first tube 821, a second tube 822, and a third tube 823. A stop plate 84 having a V-shaped block 841 on a bottom thereof is pivotally mounted by a pivot 83 to an inlet end of the first tube 821. A tube 85 extends laterally outward from the first tube 921. An end of a push rod 932 of the control mechanism 9 extends through the tube 85 into the first tube 921 and is operably connected to the V-shaped block 841. Further, a stop 86 having a V-shaped block 861 on a bottom thereof is pivotally mounted by another pivot 88 to a lower outlet end of the third tube 823. Two connecting rods 871 are mounted to both sides of the third tube 823 and each includes a positioning plate 873 welded to a lower end thereof. Two ends of each positioning plate 873 are fixed in the associated adjusting slots 72 by winged bolts. The control mechanism 9 includes a control box 91 in which a motor M is mounted. The motor M includes a shaft 92 on which an upper sprocket 93 and a lower sprocket 94 are mounted. Each sprocket 93, 94 has a chain 931, 96 mounted therearound. A restraining plate 933 is provided adjacent to the chain 931, and another restraining plate 954 is provided adjacent to the chain 96. Each chain 931, 96 has a push rod 932, 961 connected thereto. The lower sprocket 96 includes a bearing 95, and an L-shaped bracket 953 is attached to a side of the bearing 95. The L-shaped bracket 953 is fixed to a side of the third tube 823. When the motor M turns at a predetermined time, the chains 931 and 96 are turned to thereby control opening and closing of the telescopic tube assembly 82.

The automatic feeding apparatus may feed the pets at the predetermined time by means of using a timer mounted in the control box 91. The winged bolts 874 can be turned to move the positioning plates 873 and the connecting rods 871 vertically. The telescopic tube assembly 82 is thus adjusted to thereby adjust the amount of food for the pet(s).

However, there are too many elements for the automatic feeding apparatus. Manufacture and assembly for the automatic feeding apparatus are troublesome and costly. The design of pushing the stop plates 84 and 86 for opening/closing the feeding mechanism 8 through the use of the upper and lower sprockets 93 and 94, the chains 931 and 96, and the push rods 932 and 961 is too complicated and thus apt to malfunction. Maintenance is also difficult. Further, the stop 86 that controls opening and closing of the telescopic tube assembly 82 are always subject to the load of food is merely supported by the pivot 88. A gap tends to be generated between the stop 86 and the lower end of the third tube 823, and the food would fail through the gap. Further, surplus feeding could not be avoided. If the overall length of the telescopic tube assembly 82 has been set for feeding three days and three meals a day, the control box 91 activates the motor M on time to urge the food particles enter the tube 92, and the stop 86 is opened to let the food particle fall into the food pan for the pet(s). If the pet(s) has(have) a poor appetite, the food particles would remain in the food pan for the pet(s). After several automatic dispense of the food, the surplus food particles would overflow to the floor and cause a mess.

SUMMARY OF THE INVENTION

An object of the present invention is to provide an automatic feeding apparatus for pets to prevent surplus feeding.

An automatic feeding apparatus for pets in accordance with the present invention comprises a housing including an elevated bottom plate, the bottom plate having an opening. A slide is mounted below the opening and located above a food pan for pets. A hopper is mounted in the housing and above the bottom plate. The hopper receives food particles for pets and has a feed outlet. A dispense plate is rotatably supported between the bottom plate and the hopper. The dispense plate includes at least one hole for receiving a dispense cylinder therein, the dispense cylinder including a through-hole.

The dispense plate is turned at a predetermined time for turning the dispense cylinder. The food particles enter the through-hole of the dispense cylinder via the feed outlet of the hopper when the dispense cylinder is moved to a position below the feed outlet. The food particles in the dispense cylinder falls into the food pan via the opening of the bottom plate and the slide when the dispense cylinder is moved to a position above the opening of the bottom plate.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
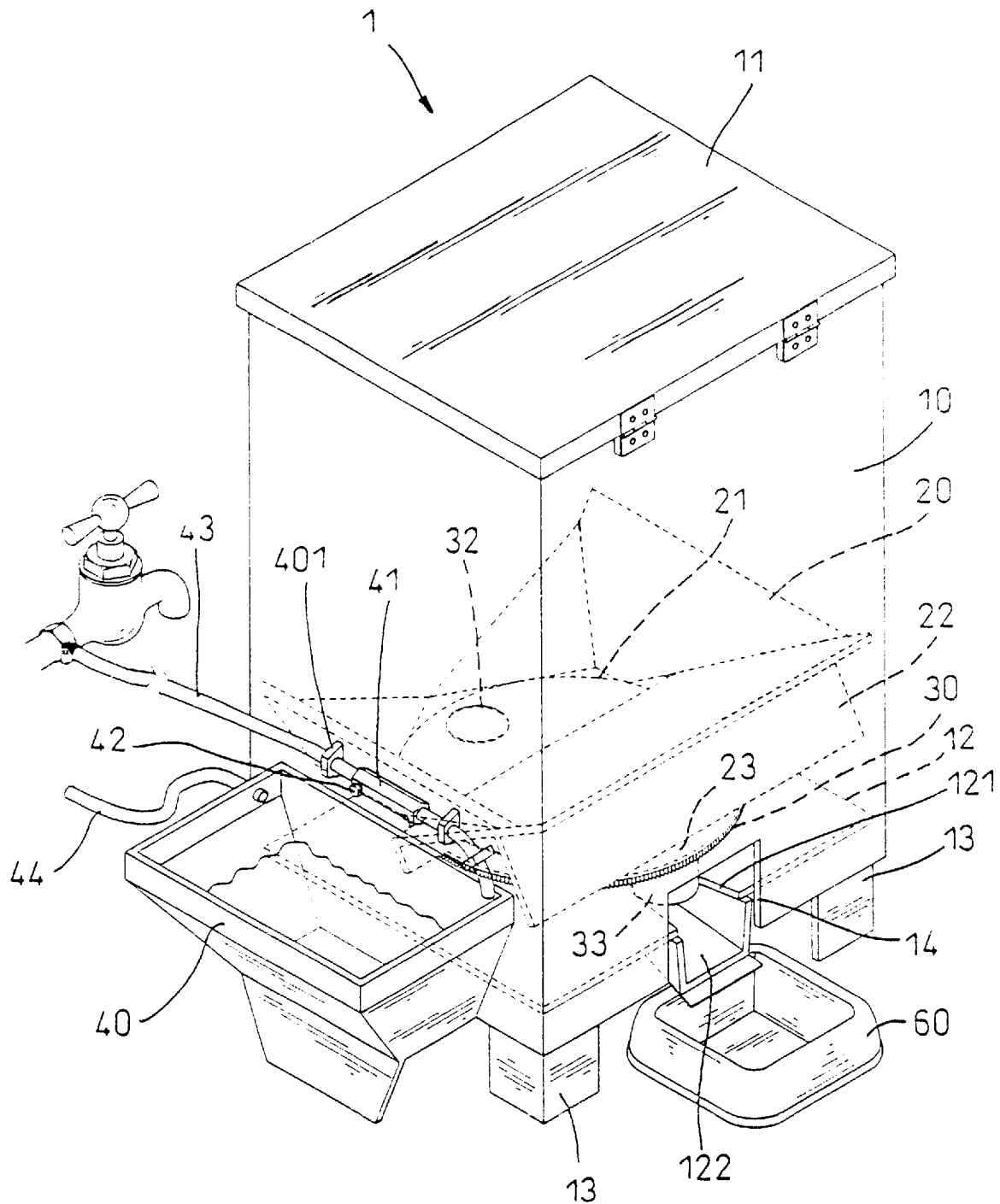
FIG. 1 is a perspective view of an automatic feeding apparatus for pets in accordance with the present invention.
Figure 2:
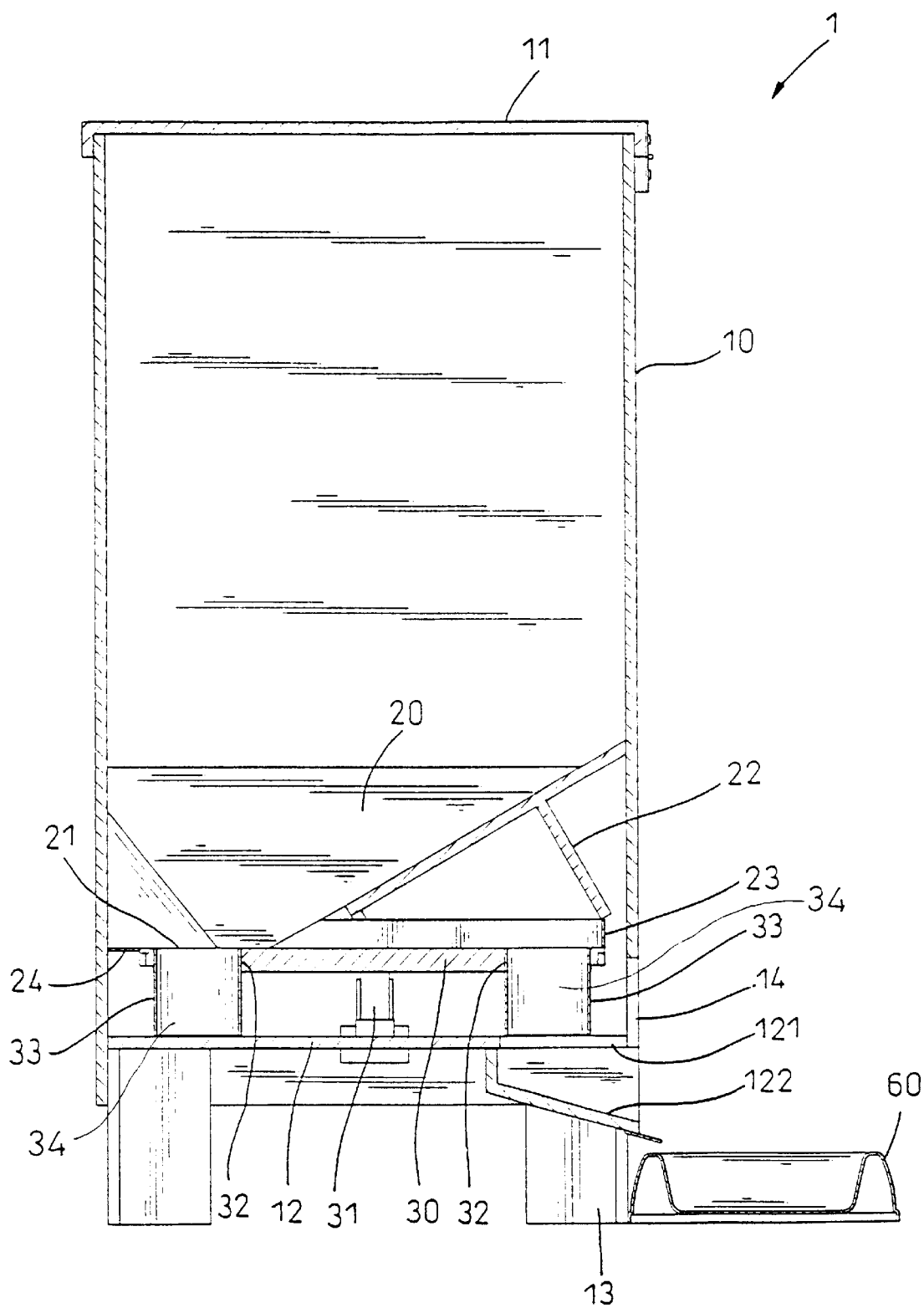
FIG. 2 is a sectional view of the automatic feeding apparatus for pets in accordance with the present invention.

Referring to FIGS. 1 and 2, an automatic feeding apparatus for pets in accordance with the present invention generally comprises a housing 10 having a bottom plate 12 on a bottom thereof and a cover 11 pivoted to an upper end thereof. A plurality of legs 13 are attached to an underside of the bottom plate 12 for elevating the bottom plate 12 and for supporting the housing 10. The housing 10 includes an opening 14 in a lower portion of a side thereof. The bottom plate 12 includes an opening 121 adjacent to the opening 14, and a slide 122 is mounted below the opening 121. A food pan for pet(s) 60 is placed on the ground and located below a lower end of the slide 122 for receiving food.

A dispense plate 30 is rotatably supported above the bottom plate 31 by a shaft 31 and includes a plurality of teeth (not labeled) in an outer periphery thereof. At least one hole 32 is defined in the dispense plate 30. In this embodiment, there are two holes 32 that are diametrically opposed to each other. A dispense cylinder 33 is mounted in each hole 32 and has a vertical through-hole 34. A lower end of each dispense cylinder 33 is in intimate contact with the dispense plate 30. A hopper 20 is mounted in the housing 10 and above the dispense plate 30. The hopper 20 has a feed outlet 21 in a lower end thereof. An inclined support 22 is attached to the hopper 20 and may have a side fixed to an inner periphery of the housing 10.

An arcuate plate 23 is mounted to a bottom of the support 22 and the hopper 20 for sealing an upper side of the dispense plate 30. A sealing plate 24 may be provided to seal the bottom of the hopper 20.

Figure 3:
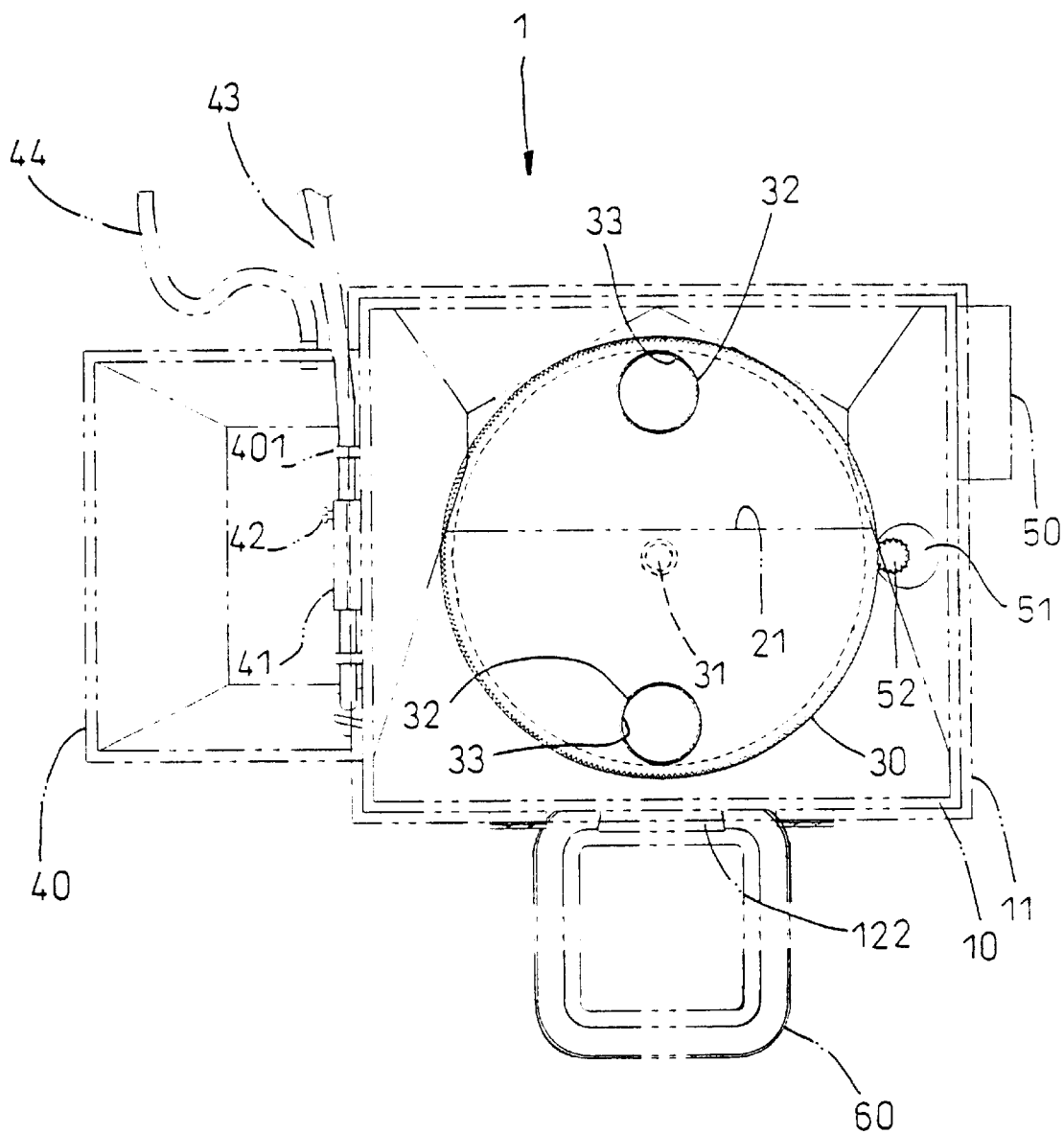
FIG. 3 is a top view of a dispense plate of the automatic feeding apparatus for pets in accordance with the present invention.

Referring to FIG. 3, a controller 50 is mounted in the housing 10 for activating a motor or reducing device 50 having an output shaft (not labeled). A gear 52 is fixed on the output shaft of the reducing device 50 and meshes with the teeth of the dispense plate 30. Thus, the dispense plate 30 is turned when the reducing device 51 is activated.

A water trough 40 for receiving water is attached to another side of the housing 10. A water supply tube 43 is provided for supplying water into the water trough 40. The water supply tube 43 has an end attached to a water source (e.g., a faucet). The other end of the water supply tube 43 is held by at least one holding plate 401 fixed to the housing 10. A valve 41 is mounted to the water supply tube 43 and includes an adjusting screw 42 that can be turned to adjust the flow rate of water. An overflow tube 44 may be provided to an upper end of the water trough 40 for draining surplus water in the water trough 40. The overflow tube 44 may be connected to a drain in the house.

Figure 4:
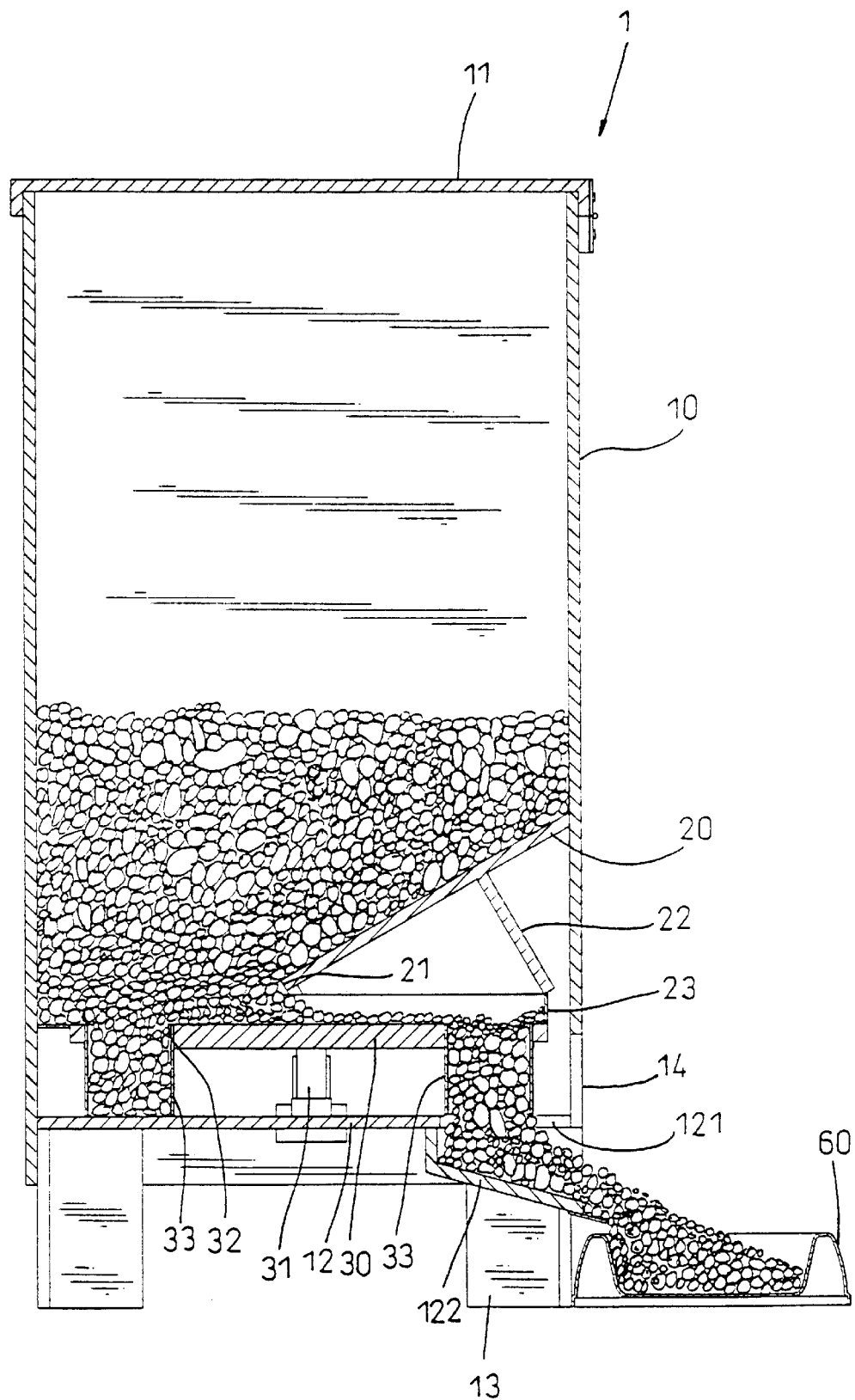
FIG. 4 is a sectional view similar to FIG. 2, illustrating automatic feeding and prevention of surplus feeding.
Figure 5:
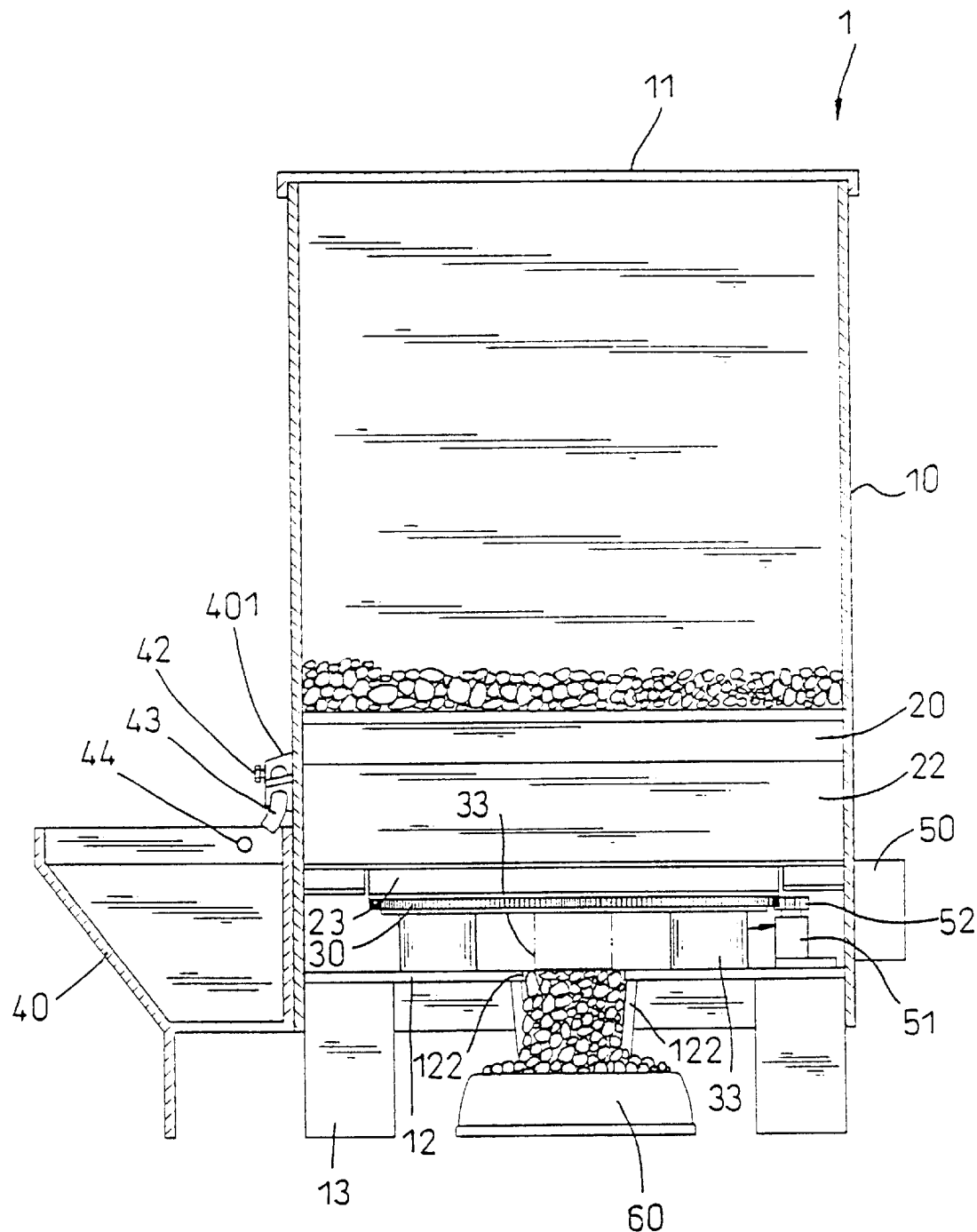
FIG. 5 is another sectional view of the automatic feeding apparatus for pets in accordance with the present invention.
Figure 6:
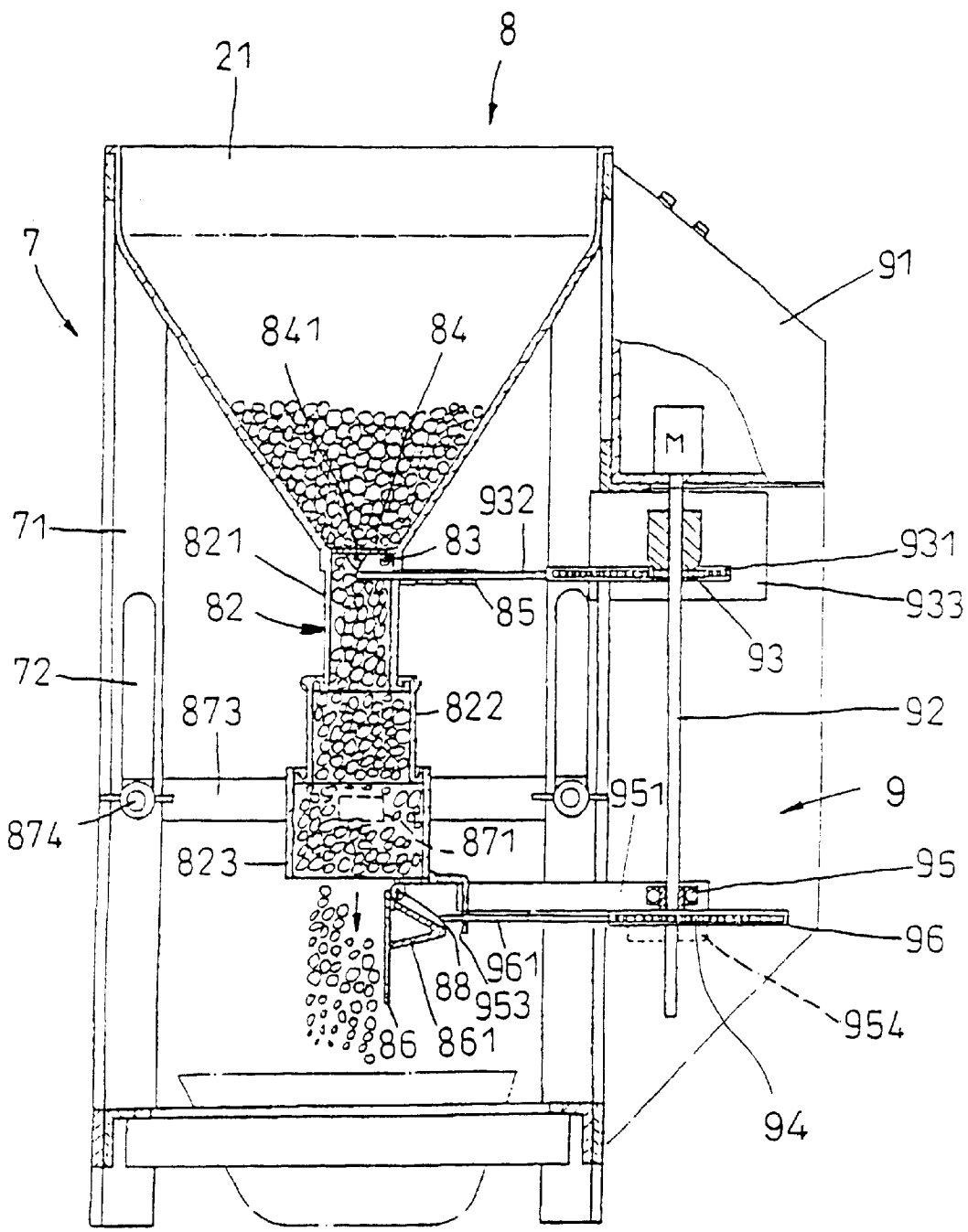
FIG. 6 is a sectional view of a conventional automatic feeding apparatus for pets.

In use, referring to FIGS. 3 through 5, food for pets in the shape of particles ("food particles") is poured into the hopper 20. The food particles enters the dispense cylinder 33 located below the feed outlet 21 of the hopper 20. Since the lower end of each dispense cylinder 33 is in intimate contact with the dispense plate 30, leakage of the food particles is impossible. When the reducing device 51 is activated at a .predetermined time by the controller 50, the dispense plate 30 is turned via transmission by the gear 52. Thus, the dispense cylinders 33 are moved to a position above the opening 121 of the bottom plate 12 at which the food particles fall and slide through the slide 122 into the food pan 60. Thus, the pet(s) is(are) fed at the predetermined time, and II the water trough 40 supplies water.

The empty dispense cylinder 33 receives food particles when it reaches a position below the feed outlet 21. The controller 50 may include a timer to determine how many times the pet(s) to be fed. It is determined by the times of the dispense cylinders 33 passing over the opening 121 of the bottom plate 12.

In a case that the pet(s) has(have) a poor appetite, the food pan 60 and the slide 122 are full with the food particles after several dispense of food. Nevertheless, the food particles in the dispense cylinder 33 that is located above the opening 121 of the bottom plate 12 could not fall, best shown in FIGS. 4 and 5. As a result, further dispense of the food particles is stopped. Surplus feeding is avoided accordingly.

Although the invention has been explained in relation to its preferred embodiment, it is to be understood that many other possible modifications and variations can be made without departing from the scope of the invention as hereinafter claimed.

What is claimed is:

1. An automatic feeding apparatus for pets, comprising:

a housing including an elevated bottom plate, the bottom plate having an opening, a slide being mounted below the opening and adapted to be located above a food pan for pets;

a hopper mounted in the housing and above the bottom plate, the hopper receiving food particles for pets and having a feed outlet;

a dispense plate rotatably supported between the bottom plate and the hopper, the dispense plate including at least one hole for receiving a dispense cylinder therein, the dispense cylinder including a through-hole;

wherein the dispense plate is turned at a predetermined time for turning said at least one dispense cylinder, wherein the food particles enter the through-hole of said at least one dispense cylinder via the feed outlet of the hopper when said at least one dispense cylinder is moved to a position below the feed outlet, and wherein the food particles in said at least one dispense cylinder falls into the food pan via the opening of the bottom plate and the slide when said at least one dispense cylinder is moved to a position above the opening of the bottom plate.

2. The automatic feeding apparatus as claimed in claim 1, wherein the dispense plate includes a plurality of teeth in an outer periphery thereof, the automatic feeding apparatus further including a reducing device and a controller for activating the reducing device, the reducing device having an output shaft with a gear fixed thereon, the gear meshing with the teeth of the dispense plate.

3. The automatic feeding apparatus as claimed in claim 1, further comprising a water trough mounted to a side of the housing.

4. The automatic feeding apparatus as claimed in claim 3, further comprising a water supply tube for supplying water into the water trough.

5. The automatic feeding apparatus as claimed in claim 4, further comprising an overflow tube mounted to an upper end of the water trough.

6. The automatic feeding apparatus as claimed in claim 3, wherein the water supply tube are supported by at least one holding plate fixed to a side of the housing, the water supply tube further including a valve mounted therein, the valve including an adjusting screw for adjusting a flow rate of the water supply tube.

7. The automatic feeding apparatus as claimed in claim 1, further comprising means for sealing the dispense plate for preventing leakage of the food particles.

* * * * *